(12) United States Patent
Schneider

(10) Patent No.: US 11,247,633 B1
(45) Date of Patent: Feb. 15, 2022

(54) OCCUPANT RESTRAINT SYSTEM FOR A VEHICLE SEAT INCLUDING AN INFLATABLE TENSIONING MEMBER FOR AN AIRBAG

(71) Applicant: AUTOLIV ASP, INC., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/079,969

(22) Filed: Oct. 26, 2020

(51) Int. Cl.
  *B60R 21/2338* (2011.01)
  *B60R 21/207* (2006.01)
  *B60R 21/239* (2006.01)
  *B60R 21/231* (2011.01)

(52) U.S. Cl.
  CPC ........ *B60R 21/2338* (2013.01); *B60R 21/207* (2013.01); *B60R 21/239* (2013.01); *B60R 2021/23107* (2013.01); *B60R 2021/23386* (2013.01)

(58) Field of Classification Search
  CPC . B60R 21/2338; B60R 21/207; B60R 21/239; B60R 2021/23107; B60R 2021/23386
  See application file for complete search history.

(56) References Cited

U.S. PATENT DOCUMENTS

| | | | |
|---|---|---|---|
| 8,690,187 B2 * | 4/2014 | Fukawatase | B60R 21/207 |
| | | | 280/730.2 |
| 9,132,798 B2 * | 9/2015 | Yasuoka | B60R 21/233 |
| 10,189,432 B2 | 1/2019 | Matsushita et al. | |
| 2016/0144818 A1 * | 5/2016 | Mihm | B60R 21/2338 |
| | | | 280/730.2 |
| 2019/0248323 A1 | 8/2019 | Saito et al. | |
| 2021/0094499 A1 * | 4/2021 | Deng | B60R 21/01554 |
| 2021/0300292 A1 * | 9/2021 | Yamada | B60R 21/207 |

FOREIGN PATENT DOCUMENTS

| | | | | |
|---|---|---|---|---|
| KR | 102096850 B1 * | 4/2020 | | |
| WO | WO-2013108473 A1 * | 7/2013 | | B60R 21/18 |
| WO | 2019107053 A1 | 6/2019 | | |
| WO | 2019107073 A1 | 6/2019 | | |
| WO | 2020017281 A1 | 1/2020 | | |
| WO | WO-2020130427 A1 * | 6/2020 | | B60R 21/268 |

\* cited by examiner

*Primary Examiner* — Drew J Brown
(74) *Attorney, Agent, or Firm* — Harness, Dickey & Pierce, P.L.C.; Stephen T. Olson

(57) ABSTRACT

An occupant restraint system for a seat of a vehicle. The occupant restraint system includes at least a first airbag deployable and at least a first tensioning member. The first airbag is deployable from the seat. The first tensioning member has a first portion for receiving inflation gases and a second portion attachable to the seat at a mounting location. The tensioning member including a least a first webbing elongated between the first portion and the second portion. The first webbing is at least partially constructed of a first inflatable tubular webbing adapted to receive inflation gases for tensioning the tensioning member and delivering inflation gases to the airbag upon airbag deployment.

19 Claims, 4 Drawing Sheets

OCCUPANT RESTRAINT SYSTEM FOR A VEHICLE SEAT INCLUDING AN INFLATABLE TENSIONING MEMBER FOR AN AIRBAG

FIELD

The present disclosure generally concerns seat integrated occupant restraint systems. More particularly, the present disclosure relates to an occupant restraint system for a vehicle seat including an inflatable tensioning member for an airbag.

BACKGROUND

This section provides background information related to the present disclosure which is not necessarily prior art.

Inflatable occupant restraints or airbags are commonly included within motor vehicles. In the event of an accident or impending accident, a sensor within the vehicle measures abnormal deceleration, for example, and triggers inflation of the airbag within a few milliseconds with gas produced by a device commonly referred to as an "inflator". The inflated airbag cushions the vehicle occupant from impact forces.

It is generally known to provide a vehicle seat with airbags arranged to deploy from the vehicle seat on laterally opposing sides of a seated occupant. One such occupant restraint system for a vehicle seat is shown and described in U.S. Pat. No. 10,189,432. This patent generally discloses right and left airbags normally stored in right and left lateral sides of a seat back of the seat, respectively. Tension members are connected to both of the airbags and to the vehicle seat. Upon inflation and deployment of the airbags, the tension members operate to maintain a desired positioning of the airbags to thereby more securely restrain the occupant upon deployment of the airbags. U.S. Pat. No. 10,189,432 is incorporated by reference as if fully set forth herein.

While known occupant restraint systems for vehicle seats, including the occupant restraint system of U.S. Pat. No. 10,189,432, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide an occupant restraint system for a seat of a vehicle including one or more inflatable tensioning members.

It is another general object of the present teachings to provide an occupant restraint system for a seat of a vehicle with improved webbing tension and faster airbag cushion fill time.

It is a related and more particular object of the present teachings to provide an occupant restraint system for a seat of a vehicle that integrates inflatable webbing or fill tubes into an airbag that act as an inflation gas manifold to distribute inflation gas quickly into the airbag.

In accordance with one particular aspect, the present teachings provide an occupant restraint system for a seat of a vehicle. The occupant restraint system includes at least a first airbag and at least a first tensioning member. The first airbag is deployable from the seat. The first tensioning member has a first portion for receiving inflation gases and a second portion attachable to the seat at a mounting location. The tensioning member includes a least a first webbing elongated between the first portion and the second portion. The first webbing is at least partially constructed of a first inflatable tubular webbing adapted to receive inflation gases for tensioning the tensioning member upon airbag deployment.

In accordance with another particular aspect, the present teachings provide a vehicle seat including an inflator, a tensioning member and an airbag. The inflator is carried by the vehicle seat and operative to produce inflation gases. The tensioning member has a first portion in fluid communication with the inflator and a second portion attached to the seat at a mounting location. The tensioning member further includes at least a first webbing elongated between the first portion and the second portion. The first webbing is at least partially constructed of a first inflatable tubular webbing. The airbag is carried by a seatback of the vehicle seat and is deployable from the seat. The airbag is in fluid communication with the airbag for delivering the inflation gases from the inflator to the airbag. Upon inflation, the tensioning member provides inflation gases to the airbag and is operative to position the airbag.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

Figure 1:
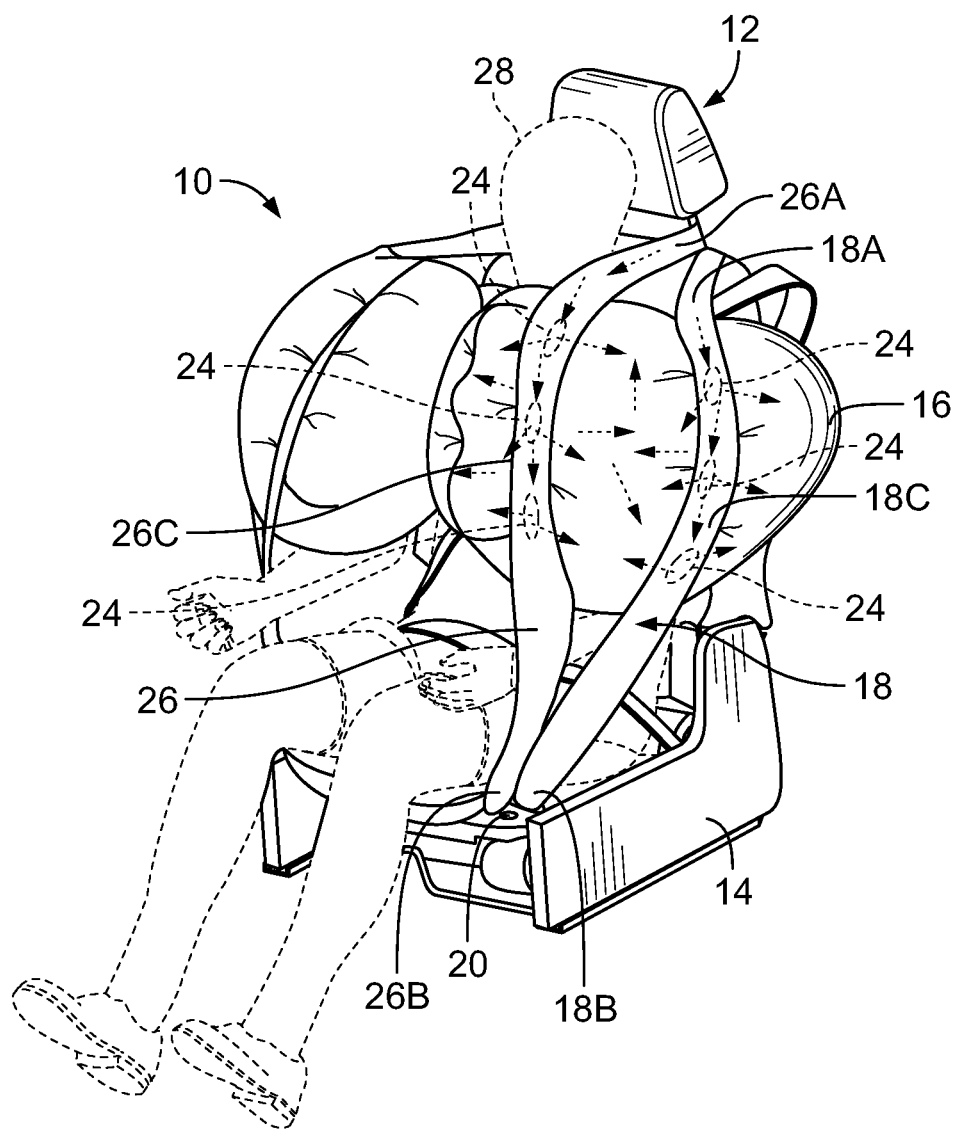
FIG. 1 is a perspective view of an occupant restraint system for a vehicle seat in accordance with the present teachings, the occupant restraint system shown operatively associated with an exemplary vehicle seat and shown following deployment of the airbags.
Figures 2, 3:
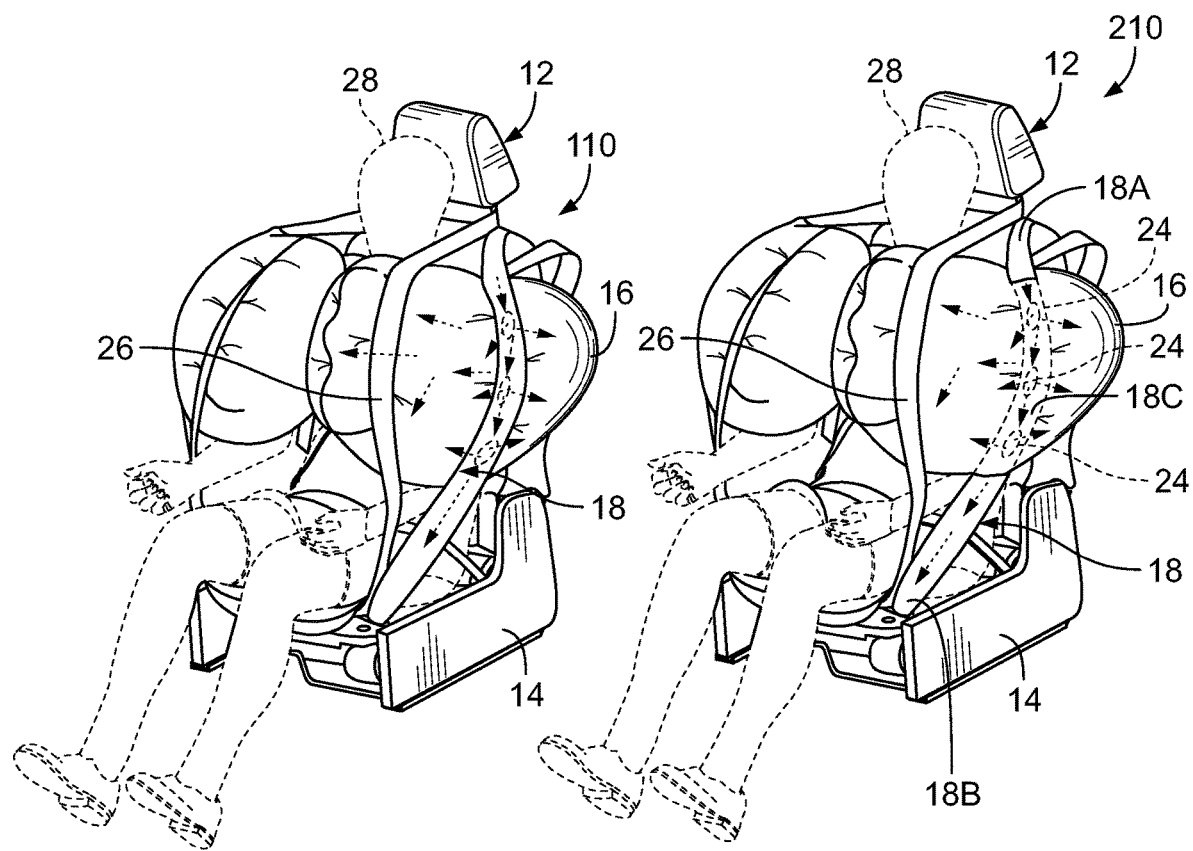
FIG. 2 is a perspective view similar to FIG. 1 illustrating another occupant restraint system in accordance with the present teachings.
FIG. 3 is another perspective view similar to FIG. 1 illustrating another occupant restraint system in accordance with the present teachings.

With initial reference to FIGS. 1 and 2 of the drawings, an occupant restraint system in accordance with the present teachings is illustrated and generally identified at reference character 10. The occupant restraint system 10 is particularly adapted for a seat 12 of a vehicle. The seat or vehicle seat 12 may have a dedicated location within a vehicle or may be movably located within a vehicle. While not limited thereto, such a movably located seat may be used in an autonomous vehicle. It will be understood that the particular vehicle seat 12 shown in the drawings is merely exemplary. In this regard, various aspects of the present teachings may be readily adapted for use with various other vehicle seats.

The occupant restraint system 10 shown in FIG. 1 and also in the various other embodiments of FIGS. 2 through 5 will be described as the systems relate to a first lateral side 14 of the seat 12. It will be understood, however, that the present teachings may be applied to both lateral sides of the seat 12. In this regard, in FIG. 1 the occupant restraint system 10 is generally shown to include at least a first airbag 16 deployable from a left lateral side of the seat 12 and at least a first tensioning member 18 associated with the first airbag 16. Except as otherwise described herein, the construction and operation of the airbags, including mounting to and deployment from the seat 12 will be understood to be exemplary insofar as the present teachings or concerned. Explaining further, other airbag configurations may adapted for use within the scope of the present teachings.

The first tensioning member 18 is shown to include a first portion 18A for receiving inflation gases and a second portion 18B attachable to a frame of the seat 12 at a mounting location 20. The first tensioning member 18 may include a least a first webbing 18C elongated between the first portion 18A and the second portion 18B. The first webbing 18C may be at least partially constructed of a first inflatable tubular webbing adapted to receive the inflation gases for tensioning the tensioning member 18 upon airbag deployment. As will become apparent below, the first webbing 18C may also be in fluid communication with the airbag 16 and function as a manifold for delivering inflation gases to the airbag 16.

Figure 1A:
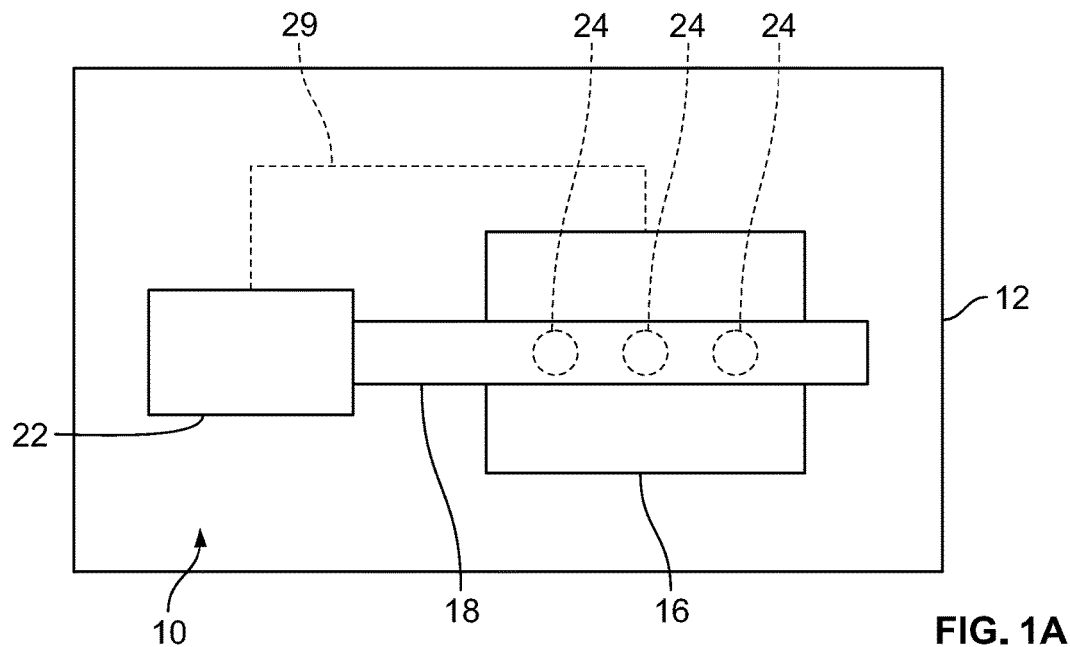
FIG. 1A is a schematic view of the occupant restraint system for a vehicle seat of FIG. 1, illustrating an inflator in fluid communication with at least a first tensioning member, the first tensioning member in fluid communication with a first airbag.

The occupant restraint system 10 is shown schematically in FIG. 1A to further include an inflator or gas guide 22 in fluid communication with the first tensioning member 18. The present teachings allow the inflator or gas guide 22 to be flexibly mounted relative to the seat 12. In one application, for example, the inflator or gas guide 22 may be packaged in the back of the seat 12.

The inflatable tubular webbing 18C of the first tensioning member 18 includes at least one manifold vent 24 providing gas communication with the first airbag 16. In the embodiment illustrated, the inflatable tubular webbing 18C is illustrated to include a plurality of manifold vents 24 in fluid communication with the first airbag 16. The inflatable tubular webbing 18C may be sewn or otherwise suitably attached to the first airbag 16. In the embodiment illustrated, the inflatable tubular webbing 18C may be sewn or otherwise suitably attached to an outer side of the first airbag 16. As such, the manifold vents 24 may be formed in a side of the inflatable tubular webbing 18C immediately adjacent the outer side of the first airbag 16 and may align with corresponding openings (not specifically shown) in the first airbag 16.

The occupant restraint system 10 may further include a second tensioning member 26. The second tensioning member 26 may be similar in construction and operation to the first tensioning member 18. In this regard, the second tensioning member 26 may include a first portion 26A for receiving inflation gases, a second portion 26B attachable to a frame of the seat 12 at a mounting location 20, and a least a first webbing 26C between the first portion 26A and the second portion 26B, the first webbing 26C including a plurality of manifold vents 24 in fluid communication with the airbag 16.

Upon activation or deployment of the occupant restraint system 10 in response to actual or impending accident conditions, the first and second tensioning members 18 and 26 are quickly inflated by the inflator or gas guide 22. The flow of inflation gases through the first and second tensioning members 18 and 26 is shown with arrows throughout the various drawings. The first and second tensioning members 18 and 26 cooperate to properly position the airbag 16 to protect an occupant 28. Inflation gases are delivered to the airbag 16 through the manifold vents 24 of the first and second tensioning members 18 and 26. Inflation gases may also be directly communicated from the inflator or gas guide 22 through a conduit 29 (see FIG. 1A).

Turning to FIG. 2, another occupant restraint system in accordance with the present teachings is illustrated and generally identified at reference character 110. With the occupant restraint system 110 and the other embodiments described below, like reference characters will be used to identify elements that are similar in construction and/or function to elements previously introduced. The occupant restraint system 110 principally differs from the occupant restraint system 10 in that the second tensioning member 26 is a flat, non-inflatable webbing. The flat, non-inflatable webbing 26 may more readily allow for the use of additional pre-tensioning, where desired. In this regards, an upper end of the flat, non-inflatable webbing 26 may be either secured to the frame of the seat 12 or to a conventional pre-tensioner.

Turning to FIG. 3, another occupant restraint system in accordance with the present teachings is illustrated and generally identified at reference character 210. The occupant restraint system 210 principally differs from the occupant restraint system 110 in that the first webbing 18C of the first tensioning member 18 is internal to the airbag 16. The manifold vents 24 of the first webbing 18C may be provided in a side of the first webbing 18C facing the interior of the airbag 16. The first webbing 18C may be sewn or otherwise secured to an inner side of the airbag 16 or may freely extend between entry and exit points on the airbag 16.

Figure 4:
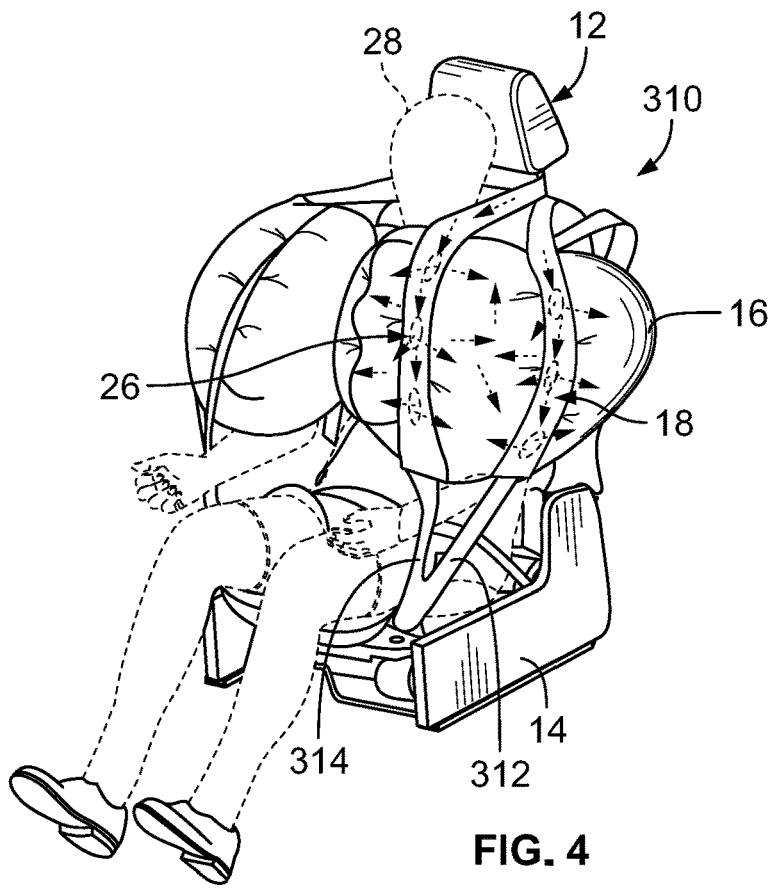
FIG. 4 is another perspective view similar to FIG. 1 illustrating another occupant restraint system in accordance with the present teachings.

Turning to FIG. 4, another occupant restraint system in accordance with the present teachings is illustrated and generally identified at reference character 310. The occupant restraint system 310 principally differs from the occupant restraint system 110 in that the first and second tensioning members 18 and 26 transition to non-inflatable portions 312 and 314 respectively. The non-inflatable portions 312 and 314 may be joined to one another and attached to the frame of the seat 12 at a common mounting point.

Figure 5:
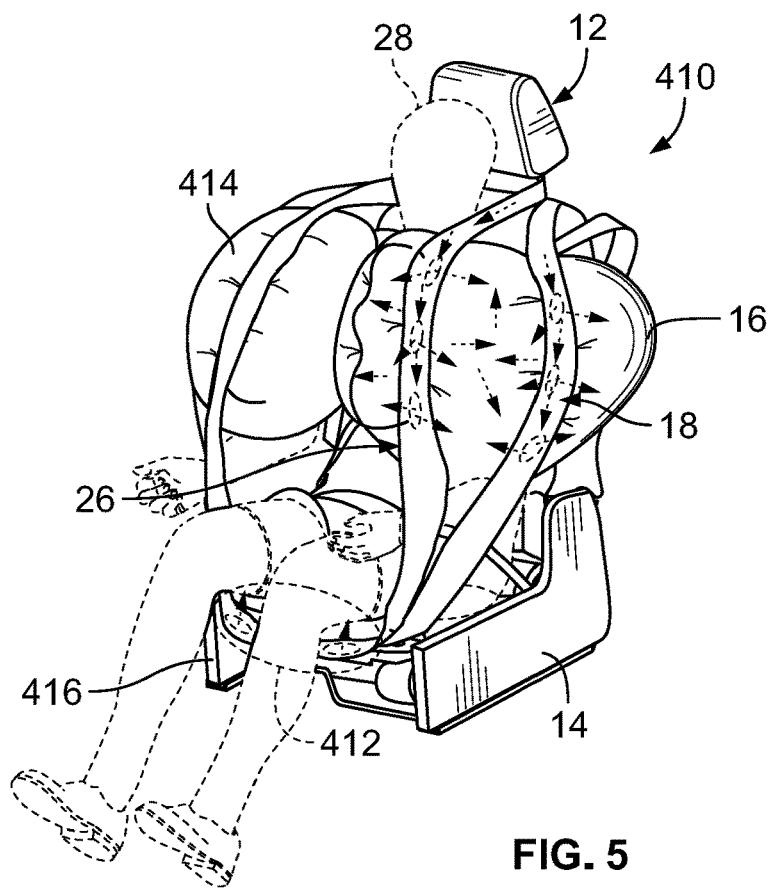
FIG. 5 is another perspective view similar to FIG. 1 illustrating another occupant restraint system in accordance with the present teachings.

Turning to FIG. 5, another occupant restraint system in accordance with the present teachings is illustrated and generally identified at reference character 410. The occupant restraint system 410 principally differs from the occupant restraint system 110 in that the first and second tensioning members 18 and 26 are in further fluid communication with an additional cushion 412. The additional cushion 412 extends under a seat cushion of the seat and resultantly under the legs of the occupant 28. The additional cushion 412 may provide additional pelvis restraint during frontal impacts, for example. The fluid communication with the first and second tensioning members 18 and 26 may extend below the seat 12 to tensioning members associated with a second airbag 414 on a second lateral side 416 of the seat 12. This fluid communication may be provided with or without the additional cushion 412.

Figure 6A:
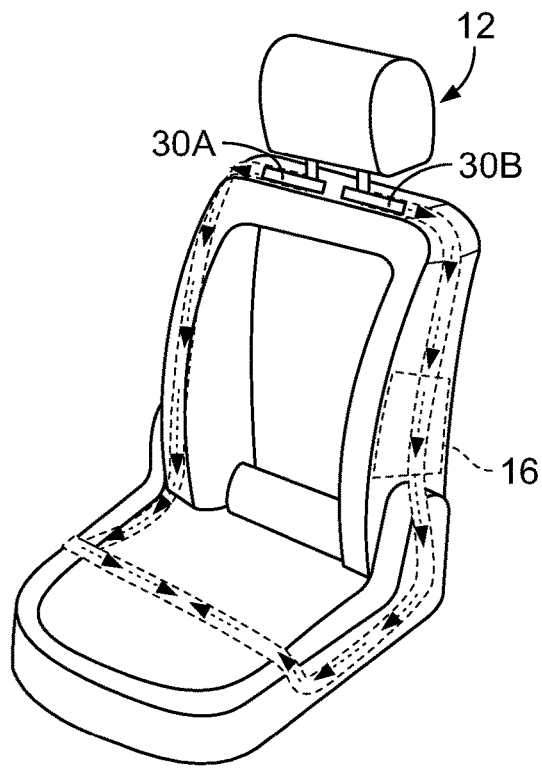
FIG. 6A is perspective view of an inflation arrangement for an occupant restraint system in accordance with the present teachings.
Figure 6B:
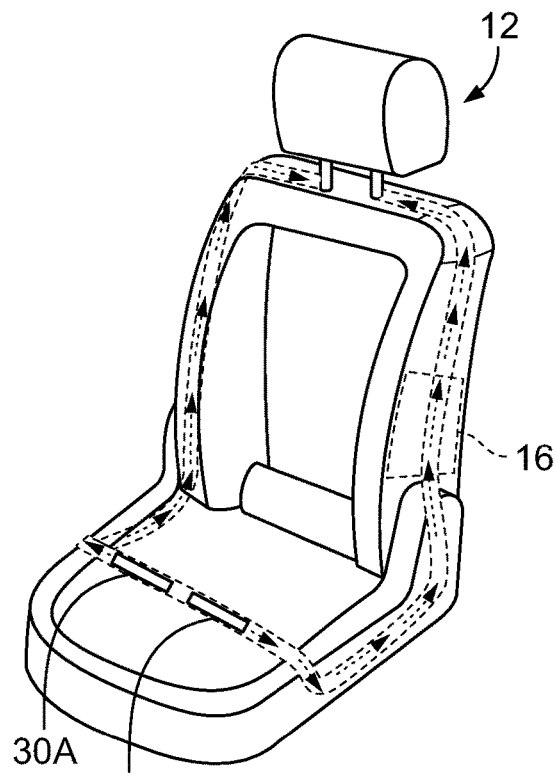
FIG. 6B is perspective view of another inflation arrangement for an occupant restraint system in accordance with the present teachings.

Turning to FIGS. 6A through 6D, various options for packaging locations of the inflation mechanisms 22 (inflators or fill tubes or both) of the present teachings relative to the seat 12 are illustrated. In FIG. 6A, first and second inflators 30A and 30B are mounted to a top of the seatback of the seat 12. In FIG. 6B, the first and second inflators 30A and 30B are mounted below the seat 12. In both mounting configurations, the inflators 30A and 30B provide inflation gases for separate inboard and outboard fill tubes. Gas flow through the fill tubes is shown by the arrows.

Figure 6C:
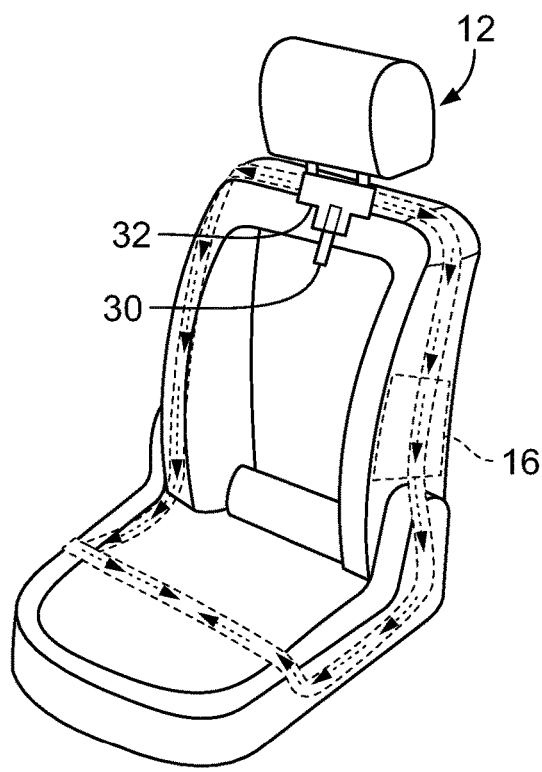
FIG. 6C is perspective view of another inflation arrangement for an occupant restraint system in accordance with the present teachings.
Figure 6D:
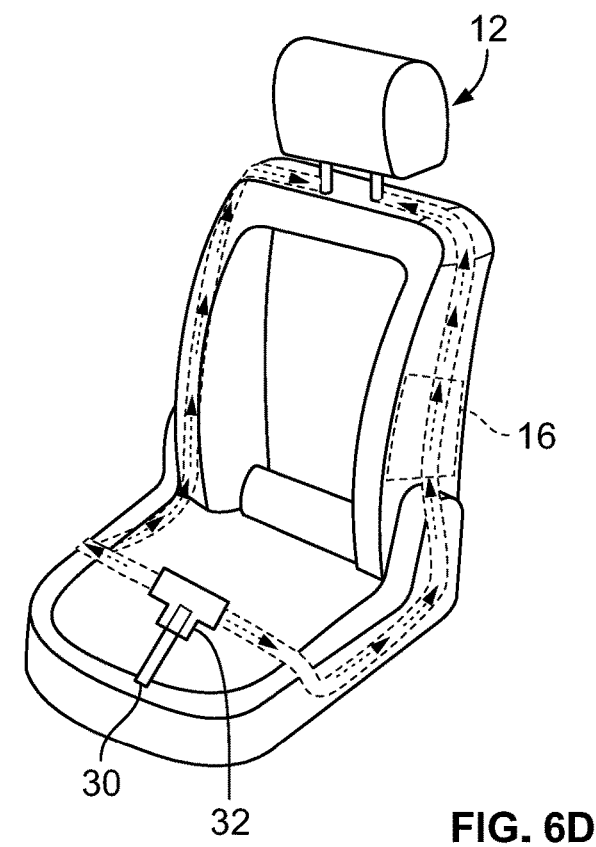
FIG. 6D is perspective view of another inflation arrangement for an occupant restraint system in accordance with the present teachings.

As shown in FIGS. 6C and 6D, a single inflator 30 may be used with a gas diffuser 32. The gas diffuser 32 is shown to have a T-shape for directing inflation gases into separate inboard and outboard fill tubes. The inflator 30 may be alternatively packaged either in the seat back or below the seat 12. In other options not shown in the drawings, the inflator 30 may be packaged along the side of the seat back frame or the side of the seat pan with a gas guide connecting the inflator 30 to the tubular webbing or fill tubes.

It will now be appreciated that the present teachings provide an occupant restraint system for a seat of a vehicle that integrates inflatable webbing or fill tubes into an airbag that act as an inflation gas manifold to distribute inflation gas quickly into the airbag. Since the initial inflated volume of the inflatable webbing or fill tubes is small relative to the entire cushion volume of the airbag, the present teachings provide inflation very quickly to provide early occupant restraint. The present teachings also provide an occupant restraint system with early tension in the inflatable webbing(s) due to localized higher pressure.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An occupant restraint system for a seat of a vehicle, the occupant restraint system comprising:
at least a first airbag deployable from the seat; and
at least a first tensioning member having a first portion for receiving inflation gases and a second portion attachable to the seat at a mounting location, the first tensioning member including a least a first webbing elongated between the first portion and the second portion, the first webbing at least partially constructed of a first inflatable tubular webbing adapted to receive the inflation gases for tensioning the first tensioning member at airbag deployment.

2. The occupant restraint system of claim 1, wherein the first tensioning member further includes a second webbing extending between the first portion and the second portion.

3. The occupant restraint system of claim 2, wherein the second webbing is at least partially constructed of a second inflatable tubular webbing.

4. The occupant restraint system of claim 2, wherein the second webbing is a flat, non-inflatable webbing.

5. The occupant restraint system of claim 1, wherein the first webbing is attached to the first airbag.

6. The occupant restraint system of claim 5, wherein the first webbing is attached to an outer surface of the first airbag.

7. The occupant restraint system of claim 5, wherein the first webbing is attached to an inner surface of the airbag.

8. The occupant restraint system of claim 1, wherein the first webbing of the first tensioning member includes at least one manifold vent providing gas communication with the first airbag.

9. The occupant restraint system of claim 1, wherein the first webbing includes a second portion constructed of a flat, non-inflatable webbing.

10. The occupant restraint system of claim 1, further comprising an inflatable pelvis restraint member for extending below the seat, the inflatable pelvis restraint member in fluid communication with the first webbing of the first tensioning member.

11. The occupant restraint system of claim 1, in combination with the seat, the first airbag carried by a seatback of the seat, the first and second portions of the first tensioning member attached to the seat.

12. A method of restraining an occupant seated on the vehicle seat with the occupant restraint system of claim 1, the method comprising:
inflating the first webbing of the first tensioning member; and
inflating the first airbag.

13. The method of claim 12, further comprising venting gas from the first webbing of the first tensioning member to the first airbag.

14. A vehicle seat comprising:
an inflator carried by the vehicle seat and operative to produce inflation gases;
a tensioning member having a first portion in fluid communication with the inflator and a second portion attached to the seat at a mounting location, the tensioning member including at least a first webbing elongated between the first portion and the second portion, the first webbing at least partially constructed of a first inflatable tubular webbing; and an airbag carried by a seatback of the vehicle seat and deployable from the seat, the airbag in fluid communication with the tensioning member for delivering the inflation gases from the inflator to the airbag, wherein the tensioning member upon inflation is operative to provide inflation gases to the airbag and position the airbag.

15. The vehicle seat of claim 14, wherein the tensioning member includes a plurality of internal manifold vents for gas communication between first inflatable tubular webbing and airbag.

16. The vehicle seat of claim 15, wherein the tensioning member is adapted to fill with the inflation gases before complete deployment of the airbag.

17. The vehicle seat of claim 14, wherein the tensioning member is attached to an outer surface of the airbag.

18. The vehicle seat of claim 14, wherein the tensioning member is attached to an inner surface of the airbag.

19. The vehicle seat of claim 14, wherein the tensioning member has a first inflatable volume and the airbag has a second inflatable volume, the first inflatable volume being smaller than the second inflatable volume.

* * * * *